US012651011B2

(12) United States Patent
Texier et al.

(10) Patent No.: US 12,651,011 B2
(45) Date of Patent: Jun. 9, 2026

(54) DEVICE, SYSTEM AND METHOD FOR PROVIDING A HYBRID COMMAND LINE

(71) Applicant: AMADEUS S.A.S., Biot (FR)

(72) Inventors: Rodolphe Texier, Biot (FR); Massimiliano Maini, Biot (FR); Jatin Kaushik, Biot (FR); Johan Christian Antonin, Biot (FR); Veronique Pantera, Biot (FR); Pierre-Jean Reissman, Biot (FR)

(73) Assignee: Amadeus S.A.S., Biot (FR)

( * ) Notice: Subject to any disclaimer, the term of this patent is extended or adjusted under 35 U.S.C. 154(b) by 248 days.

(21) Appl. No.: 18/285,342

(22) PCT Filed: Apr. 5, 2022

(86) PCT No.: PCT/EP2022/058983
§ 371 (c)(1),
(2) Date: Oct. 2, 2023

(87) PCT Pub. No.: WO2022/218758
PCT Pub. Date: Oct. 20, 2022

(65) Prior Publication Data
US 2024/0184811 A1      Jun. 6, 2024

(30) Foreign Application Priority Data

Apr. 15, 2021    (EP) .................................... 21305500

(51) Int. Cl.
*G06F 16/3332*       (2025.01)
*G06F 3/023*        (2006.01)
(Continued)

(52) U.S. Cl.
CPC ........ *G06F 16/3323* (2019.01); *G06F 3/0237* (2013.01); *G06F 16/3332* (2019.01); *G06F 40/274* (2020.01)

(58) Field of Classification Search
CPC ........................................ G06F 16/3323–3332
See application file for complete search history.

(56) References Cited

U.S. PATENT DOCUMENTS

| | | | |
|---|---|---|---|
| 9,459,765 B2 | 10/2016 | Carapella et al. | |
| 10,339,221 B2 | 7/2019 | Colic et al. | |
| (Continued) | | | |

FOREIGN PATENT DOCUMENTS

| | | |
|---|---|---|
| WO | 2013000884 A1 | 1/2013 |

OTHER PUBLICATIONS

International Search Report, mailed Aug. 1, 2022, issued in corresponding PCT Patent Application No. PCT/EP2022/058983, Filed Apr. 5, 2022.

*Primary Examiner* — Tony Mahmoudi
*Assistant Examiner* — Nirav K Khakhar
(74) *Attorney, Agent, or Firm* — PERRY + CURRIER INC.

(57) ABSTRACT

A device, system and method for providing a hybrid command line is provided. The device provides, at a display screen, a command line in association with a page defined by a document object model that includes metadata defining available natural language (NL) based commands for the device and/or the page. Partial text, received at the command line according to an NL-based format, is used to populate an autocomplete list of NL-based commands, mapped to corresponding server-compatible commands, and filtered by the metadata. An NL-based command is selected from the autocomplete list is provided to a server which converts the NL-based command to a corresponding server-compatible command. Results from the server are provided at the display screen in a graphical format which include graphical selectable options which, when selected, cause correspond- (Continued)

ing commands to be provided to the server in a server-compatible and/or NL-based format.

15 Claims, 6 Drawing Sheets

(51) Int. Cl.
G06F 16/332 (2019.01)
G06F 40/274 (2020.01)

(56) References Cited

U.S. PATENT DOCUMENTS

| | | | |
|---|---|---|---|
| 2006/0106769 A1* | 5/2006 | Gibbs | G06F 40/274 |
| 2012/0330982 A1* | 12/2012 | Arnaud | G06F 16/951 |
| | | | 707/E17.062 |

* cited by examiner

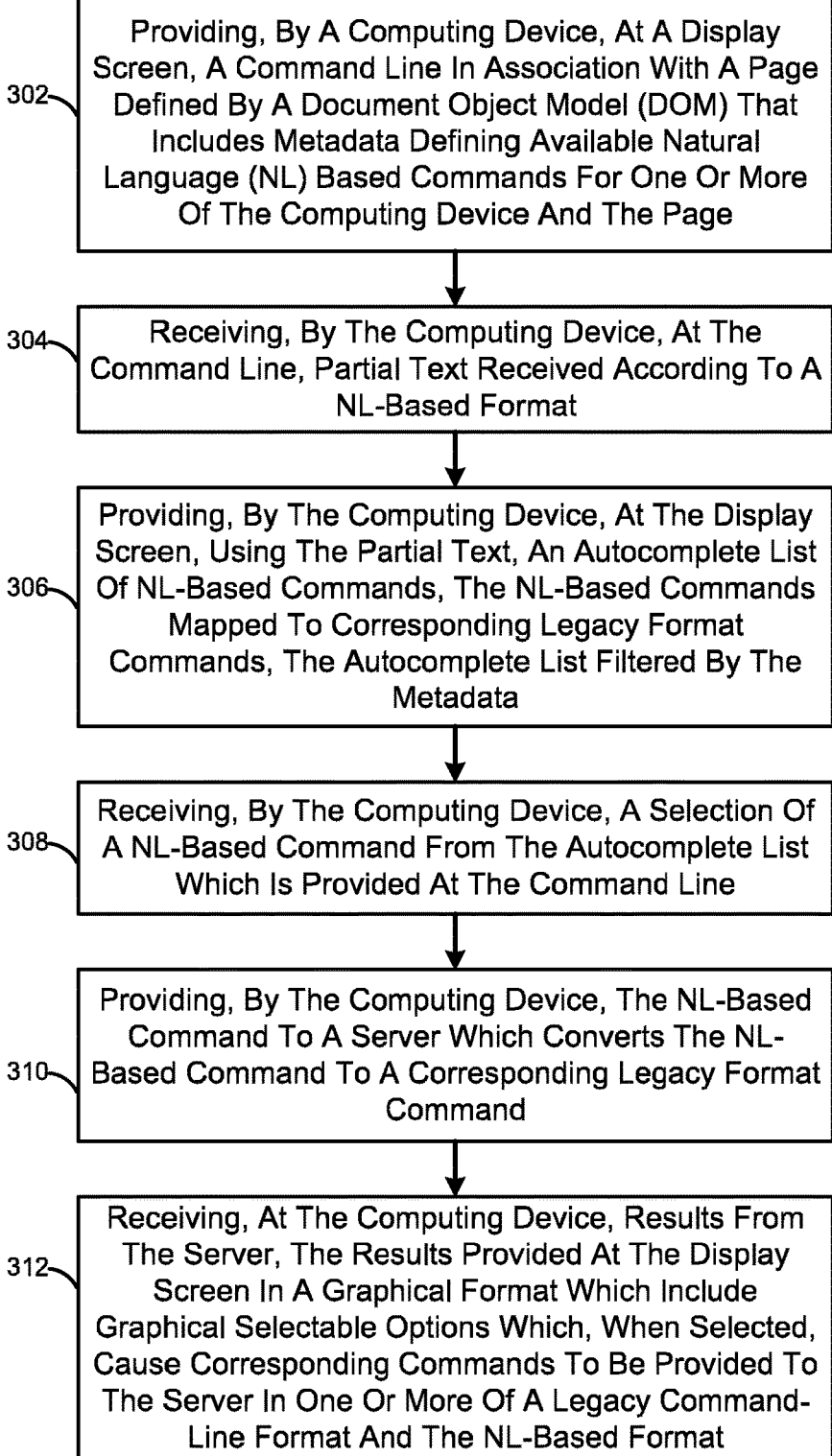

302 — Providing, By A Computing Device, At A Display Screen, A Command Line In Association With A Page Defined By A Document Object Model (DOM) That Includes Metadata Defining Available Natural Language (NL) Based Commands For One Or More Of The Computing Device And The Page 304 — Receiving, By The Computing Device, At The Command Line, Partial Text Received According To A NL-Based Format 306 — Providing, By The Computing Device, At The Display Screen, Using The Partial Text, An Autocomplete List Of NL-Based Commands, The NL-Based Commands Mapped To Corresponding Legacy Format Commands, The Autocomplete List Filtered By The Metadata 308 — Receiving, By The Computing Device, A Selection Of A NL-Based Command From The Autocomplete List Which Is Provided At The Command Line 310 — Providing, By The Computing Device, The NL-Based Command To A Server Which Converts The NL-Based Command To A Corresponding Legacy Format Command 312 — Receiving, At The Computing Device, Results From The Server, The Results Provided At The Display Screen In A Graphical Format Which Include Graphical Selectable Options Which, When Selected, Cause Corresponding Commands To Be Provided To The Server In One Or More Of A Legacy Command-Line Format And The NL-Based Format

DEVICE, SYSTEM AND METHOD FOR PROVIDING A HYBRID COMMAND LINE

BACKGROUND

In some environments, such as webservice environments, interfacing with servers and/or legacy servers can be challenging. For example, such servers and/or legacy servers may use server-specific and/or server-compatible commands, and the like, for example to search and/or to add to databases, and the like. Such server-compatible commands may be difficult to implement in environments where there is an expectation of use of graphics and/or natural language commands as, for example, the server-compatible commands may be in a format based on older, legacy commands, such as command line commands, and the like.

SUMMARY

A first aspect of the specification provides a method comprising: providing, by a computing device, at a display screen, a command line in association with a page defined by a document object model (DOM) that includes metadata defining available natural language (NL) based commands for one or more of the computing device and the page; receiving, by the computing device, at the command line, partial text received according to an NL-based format; providing, by the computing device, at the display screen, using the partial text, an autocomplete list of NL-based commands, the NL-based commands mapped to corresponding server-compatible commands, the autocomplete list filtered by the metadata; receiving, by the computing device, a selection of an NL-based command from the autocomplete list which is provided at the command line; providing, by the computing device, the NL-based command to a server which converts the NL-based command to a corresponding server-compatible command; and receiving, at the computing device, results from the server, the results provided at the display screen in a graphical format which include graphical selectable options which, when selected, cause corresponding commands to be provided to the server in one or more of a server-compatible format and the NL-based format.

At the method of the first aspect, the autocomplete list may be further filtered by permissions associated with one or more of: the computing device; a given user associated with the computing device; and a given entity associated with the computing device.

At the method of the first aspect, the autocomplete list may be populated from a library of available commands that maps the NL-based commands to the corresponding server-compatible commands.

At the method of the first aspect, the NL-based command may be further combined, at the command line, with input received at the page prior to the NL-based command being provided to the server.

The method of the first aspect may further comprise: generating a further NL-based command mapped to a server-compatible command based on input received at the command line; and storing the further NL-based command mapped to the server-compatible command in a library of available commands for use in populating other autocomplete lists.

The method of the first aspect may further comprise: receiving, at the command line, a server-compatible command; providing, to the server, the server-compatible command; receiving, from the server, corresponding results; and providing, at the display screen, the corresponding results in one or more of a textual format and a corresponding graphical format.

The method of the first aspect may further comprise: coordinating, between the computing device and the server, a mapping of the NL-based commands to the corresponding server-compatible commands such that the server is enabled to convert the NL-based command to the corresponding server-compatible command.

At the method of the first aspect, a mapping of the NL-based commands to the corresponding server-compatible commands may be specific to one or more of: the computing device; a given entity associated with the computing device; and a given region associated with the computing device.

At the method of the first aspect, the corresponding server-compatible commands may comprise one or more of New Distribution Capability (NDC) commands and webservice messages.

A second aspect of the specification provides a device comprising: a communication interface; and a controller configured to: provide, at a display screen, a command line in association with a page defined by a document object model (DOM) that includes metadata defining available natural language (NL) based commands for one or more of the computing device and the page; receive, at the command line, partial text received according to an NL-based format; provide, at the display screen, using the partial text, an autocomplete list of NL-based commands, the NL-based commands mapped to corresponding server-compatible commands, the autocomplete list filtered by the metadata; receive a selection of an NL-based command from the autocomplete list which is provided at the command line; provide, via the communication interface, the NL-based command to a server which converts the NL-based command to a corresponding server-compatible command; and receive, via the communication interface, results from the server, the results provided at the display screen in a graphical format which include graphical selectable options which, when selected, cause corresponding commands to be provided to the server in one or more of a server-compatible format and the NL-based format.

At the device of the first aspect, the controller may be further configured to further filter the autocomplete list by permissions associated with one or more of: the computing device; a given user associated with the computing device; and a given entity associated with the computing device.

At the device of the first aspect, the controller may be further configured to populate the autocomplete list from a library of available commands that maps the NL-based commands to the corresponding server-compatible commands.

At the device of the first aspect, the controller may be further configured to further combine the NL-based command, at the command line, with input received at the page prior to the NL-based command being provided to the server.

At the device of the first aspect, the controller may be further configured to: generate a further NL-based command mapped to a server-compatible command based on input received at the command line; and store the further NL-based command mapped to the server-compatible command in a library of available commands for use in populating other autocomplete lists.

At the device of the first aspect, the controller may be further configured to: receive, at the command line, a server-compatible command; provide, to the server, the server-compatible command; receive, from the server, corresponding results; and provide, at the display screen, the corresponding results in one or more of a textual format and a corresponding graphical format.

At the device of the first aspect, the controller may be further configured to: coordinate, with the server, a mapping of the NL-based commands to the corresponding server-compatible commands such that the server is enabled to convert the NL-based command to the corresponding server-compatible command.

At the device of the first aspect, a mapping of the NL-based commands to the corresponding server-compatible commands may be specific to one or more of: the computing device; a given entity associated with the computing device; and a given region associated with the computing device.

At the device of the first aspect, the corresponding server-compatible commands may comprise one or more of New Distribution Capability (NDC) commands and webservice messages.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 3 depicts a method for providing a hybrid command line, according to non-limiting examples.

DETAILED DESCRIPTION

Figure 1:
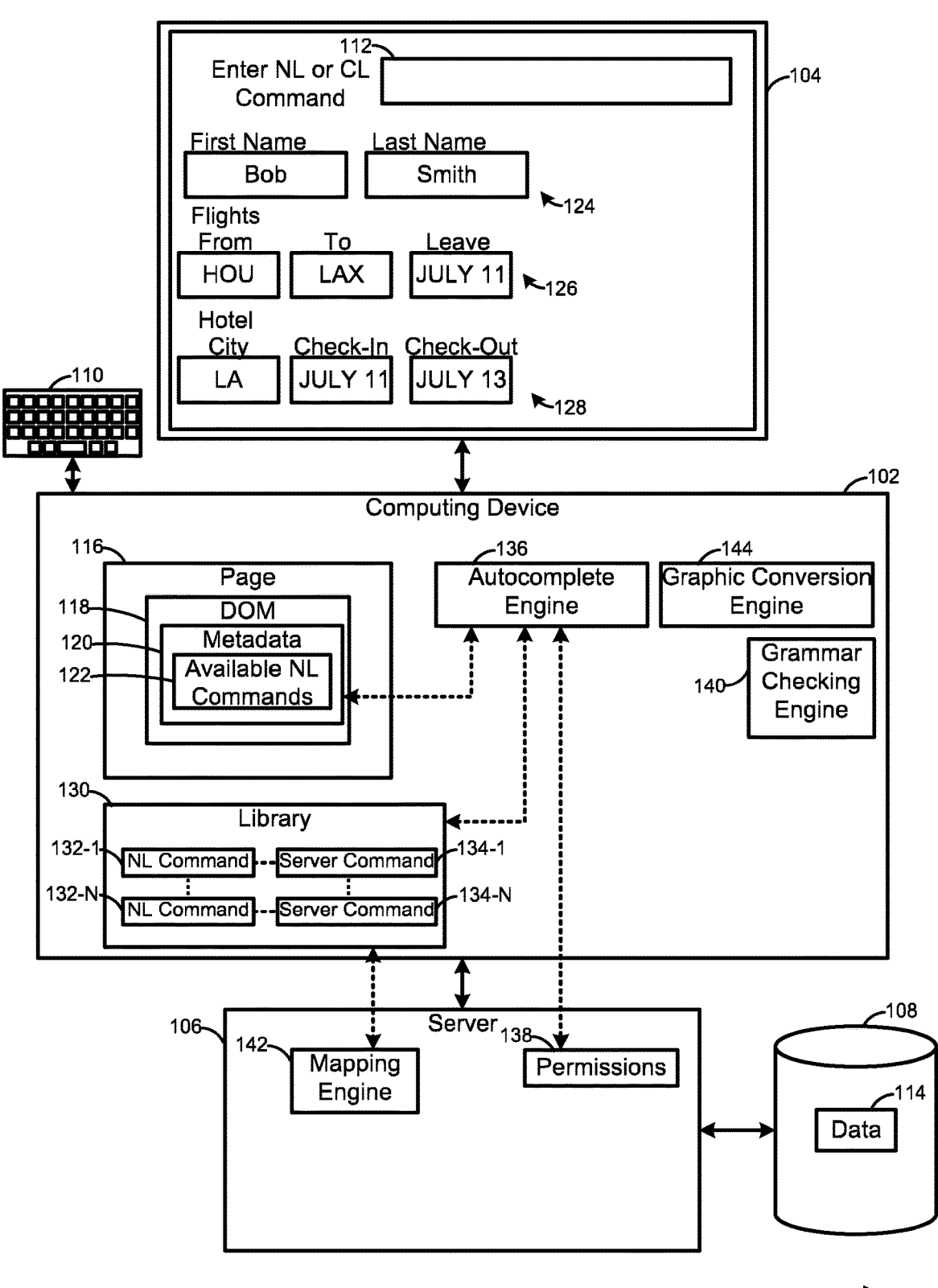
FIG. 1 depicts a system for providing a hybrid command line, according to non-limiting examples.

Attention is directed to FIG. 1 which depicts a system 100 for providing a hybrid command line.

The components of the system 100 are generally in communication via communication links which are depicted in FIG. 1, and throughout the present specification, as double-ended arrows between respective components. The communication links include any suitable combination of wireless and/or wired communication networks and, similarly, the communication links may include any suitable combination of wireless and/or wired links.

The system 100 will furthermore be described with respect to engines. As used herein, the term "engine" refers to hardware (e.g., a processor, such as a central processing unit (CPU), a graphics processing unit (GPU), an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

The system 100 comprises a computing device 102 in communication with a display screen 104 and a server 106. The system 100 further comprises a database 108 in communication with the server 106. In general, the computing device 102 may be operated via an input device 110, such as a keyboard (as depicted), a pointing device such as a mouse, and the like. The computing device 102 may be operated via the input device 110 to receive partial text at a command line 112 provided at the display screen 104. The partial text may be completed using an autocomplete list, described in more detail below, to generate a command, which is generally provided to the server 106, which implements the command.

In some examples, the command may be to search, or populate, data 114 at the database 108, as described in more detail below. Results from the server 106, determined in conjunction with implementing the command, may be returned to the computing device 102, and which may be provided as graphical results at the display screen 104, regardless of a format of the results.

In particular, the server 106, and the database 108 may be operated according to any suitable format; in the context of the travel industry, such formats may include, but are not limited to a format compatible with a New Distribution Capability (NDC) standard (e.g. a newer format) and/or a Global Distribution System (GDS) standard (e.g. on older, legacy format), and the like. Hence, for example, the data 114 may comprise searchable travel-related data such as information related to flights, trains, hotels, car rentals, and the like (though for the GDS standard, the data 114 may be for flights only). However, the data 114 may include passenger and/or traveler data, such as names, addresses, personal preferences, and the like. However, the server 106, and the database 108 may be operated according to any suitable older, legacy format for any suitable type of data.

In particular, it is understood that the server 106 is generally configured to interact with the database 108 according to commands that are in a particular server-compatible commands, which may also be referred to as cryptic commands. It is understood that such server-compatible commands and/or cryptic commands may not include whole words, and the like, and/or a name thereof may have no semantic relationship with the functionality of a server-compatible command and/or cryptic command. As such, unless there is some familiarity with such cryptic commands, the function of such cryptic commands may not be apparent from their format. Hence, for example, in such a server-compatible command, a command to search and/or shop for an available airline flight from Houston Airport to Los Angeles Airport on July 11 may be in a form of "AN11JULHOULAX" where "AN" is a server-compatible command to search for an available flight, "11JUL" represents the date of July 11, "HOU" represents the Houston Airport (e.g. "HOU" may comprise a name and/or an airport code for the Houston Airport), and "LAX" represents the Los Angeles Airport (e.g. "LAX" may comprise a name and/or an airport code for the Los Angeles Airport). Such a particular format for a server-compatible command may be referred to as "grammar" of a server-compatible command. In particular, as the command "AN" has no semantic relationship with the terms "Search" and/or "Shop", and the like, the function of the command "AN" may be difficult to semantically derive. As such, a server-compatible command may be challenging for a new user of the computing device 102 to understand and/or remember.

Hence, in general, the computing device 102 is configured to receive natural language (NL) based commands at the command line 112. It is understood that such NL-based commands may include whole words, and the like, and/or a name thereof may have a semantic relationship with the functionality of an NL-based command. As such, the function of such NL-based command may be apparent from their format.

Hence, as understood herein, the term "natural language based commands" may include commands that include whole words (e.g. in a given language) which reflect the function and/or semantics and/or meaning of the commands. For example, a NL-based command to perform a search for an available flight may be "Search" which is in contrast to the legacy command "AN" which provided no indication as to the function of "AN". Hence, an NL-based command may be used intuitively by a user of the system 100 and/or the computing device 102. While textual NL-based commands are described herein, such NL-based commands may include commands in any suitable format, including, but not limited to, words used in graphical user interfaces (GUIs) (e.g. on buttons and/or menu items, and the like), voice commands and the like. In a particular example, the system 100 may include a microphone which may receive audio input, which may be converted to text (e.g. using a speech-to-text engine, not depicted), which may be used to populate the command line 112.

In particular, the computing device 102 may be further configured to receive partial text of such NL-based commands and use an autocomplete list to complete the partial text to an available NL-based command. The NL-based command may be provided to the server 106, which may convert the NL-based command to a corresponding server-compatible command and use the corresponding server-compatible command to interact with the database 108, and the like, and return results to the computing device 102.

However, while many NL-based commands may be available, it is important that such NL-based commands correspond to a server-compatible command prior to providing to the server 106. For example, when an NL-based command is provided to the server 106 that has no corresponding server-compatible command, an error and/or null result may occur, which generally wastes processing resources at the computing device 102 and the server 106, as well as wastes bandwidth therebetween.

Furthermore, an NL-based command should generally be pertinent to a page 116 being processed by the computing device 102 in association with providing the command line 112. For example, the page 116 may be defined by a document object model 118 (DOM) that includes metadata 120 defining available NL-based commands 122 for one or more of the computing device 102 and the page 116.

For example, as depicted, the page 116 and/or the DOM 118 may further define various fields 124, 126, 128 that may be provided at the display screen 104. Put another way, the fields 124, 126, 128 may be components of Graphic User Interface (GUI) which is provided at the display screen 104 in conjunction with the computing device 102 processing the page 116. As depicted, the fields 124 are for receiving (e.g. via the input device 110) a first and last name of a passenger and/or a traveler (e.g. as depicted, such as a first name of "Bob" and a last name of "Smith"). The fields 126 are for receiving information to search for a flight "From" one airport (e.g. as depicted, an originating airport such as "HOU" or Houston Airport) "To" another airport (e.g. as depicted, a destination airport. such as "LAX" or Los Angeles Airport), as well as a date that that the flight is to "Leave" (e.g. as depicted, "July 11"). Similarly, the fields 128 are for receiving information to search for hotel room in a "City" (e.g. as depicted, "LA" or Los Angeles) as well as a "Check-In" date (e.g. as depicted, "July 11") and "Check-Out" date (e.g. as depicted, "July 13"). Hence, it is understood that the page 116 is generally for use in conjunction with searching the database 108 for travel-related information, however the page 116 and/or the other components of the system 100, may be for searching the database 108, and the like, for any suitable information.

Furthermore, the fields 124, 126, 128 are understood to be an example only and are not to be considered particularly limiting. In particular, while in the depicted example, the fields 124 include only fields for receiving a first and last name of a traveler, in other examples the fields 124 may include a field for receiving an address, age, preferences, and the like, of the traveler and/or any other suitable information. Similarly while in the depicted example the fields 126 include only a field for receiving a date for a flight from one airport to another airport, in other examples, the fields 126 may include a field for receiving a return date, and the like. Similarly while in the depicted example the fields 128 include only a field for receiving a city to search for a hotel, in other examples, the fields 126 may include fields for receiving other data to search for a hotel, such as a rating, facilities, and the like, of hotels.

However, for the page 116, only a subset of a larger body of NL-based commands may be available as defined in the metadata 120 defining such available NL-based commands 122. For example, a command to "SHOP FLIGHT" to search for a flight and a command to "SHOP HOTEL" to search for a hotel may be available, but commands to "SHOP TRAIN" to search for a train trip and/or to "ADD INS" to add insurance to a trip may not be available. Hence, for example the metadata 120 defining such available NL-based commands 122 may specifically list such available NL-based commands 122 and exclude other NL-based commands.

However, while one page 116, and corresponding DOM 118, metadata 120 and available NL-based commands 122 are depicted, the computing device 102 may have access to other pages with corresponding DOMs, metadata and available NL-based commands which may be different from the available NL-based commands 122. For example, another page may be to search (e.g. shop and/or add) for travel insurance to a trip, and the like, and such a page may include a corresponding DOM and metadata defining associated available NL-based commands.

Such pages may be stored at the computing device 102 (e.g. as described below with respect to FIG. 2), and/or such pages may be retrieved from the server 106 (and/or an associated server), for example in a webservice environment. Put another way, the computing device 102, display screen 104 and input device 110 to interact with the server 106 in providing a webservice, with the page 116, the fields 124, 126, 128 and the command line 112, and the like (e.g. and the GUI at the display screen 104) implemented in a browser that accesses pages from the server 106, and the like.

As such, the server-compatible commands described herein may comprise one or more of NDC commands and webservice messages, and/or the server-compatible commands described herein may comprise GDS commands. In general, the server-compatible commands described herein may depend on type of standard (e.g. NDC or GDS) being implemented at the server 106.

As mentioned above, NL-based commands used herein generally correspond to server-compatible commands (e.g. cryptic commands). As such, the computing device 102 further has access to a library 130 of NL-based commands 132-1, . . . 132-N mapped to corresponding server-compatible commands 134-1, . . . 134-N. The NL-based commands 132-1, . . . 132-N will be interchangeably referred to herein, collectively, as the NL-based commands 132 and, generically, as an NL-based command 132. This convention will be used elsewhere in the specification. For example, corresponding server-compatible commands 134-1, . . . 134-N will be interchangeably referred to herein, collectively, as the server-compatible commands 134 and, generically, as a server-compatible command 134. Furthermore, a mapping between an NL-based command 132 and a server-compatible command 134 at the library 130 is represented by dashed lines therebetween.

For example, an NL-based command 132 of "SHOP FLIGHT" may be mapped to a server-compatible command 134 of "AN", as described above.

Furthermore, the number "N" of NL-based commands 132 and corresponding server-compatible commands 134 in the library 130 may be any suitable number for any suitable pages that may be available to the computing device 102 (i.e. the number "N" of NL-based commands 132 may be greater than the available NL-based commands 122 for the page 116).

Furthermore, the NL-based commands 132 may be populated by an administrator of the system 100, and/or an administrator of the computing device 102, and/or a given entity associated with the computing device 102 (e.g. such as a travel agency, an airline, and the like), and/or by a user of the computing device 102, and/or via machine learning algorithms, and the like. As such, an initial list of NL-based commands 132 and corresponding server-compatible commands 134 may be populated at the library 130 and then customized for the computing device 102 and/or for a user of the computing device 102. Regardless, it is understood that the NL-based commands 132 correspond to server-compatible commands 134 which may be processed by the server 106.

In a particular example, the computing device 102, the display screen 104 and the input device 110 may be components of a terminal for a travel agency and/or an airline, and/or any other suitable given entity, and the like, located in a particular geographic region, and the like, and the NL-based commands 132 may be customized for the given entity, the particular geographic region (e.g. according to local slang and/or word usage), and/or for a particular user of the terminal. In some examples, an NL-based command 132 may be added to the library 130 with a corresponding server-compatible command 134, using a menu system, and the like, provided via the GUI at the display screen 104, and the like.

Alternatively, an NL-based command 132 may be added to the library 130 using a machine learning algorithm that monitors input at the command line 112. For example, initial input may be received at the command line 112 that does not correspond to any of the NL-based commands 132, but which may be intended, by a user of the computing device 102 to be a guess at an NL-based command (e.g. using natural language); when such initial input results in no results and/or an error and/or a null result, other input may immediately (e.g. within a threshold time period) be received at the command line 112; such other input may correspond to an NL-based command 132 of the library 130 that has a corresponding server-compatible command 134, and/or such other input may correspond to another server-compatible command compatible with the server 106 (e.g. and which be in the library 130 as a corresponding server-compatible command 134 and/or as a server-compatible command that does not correspond to an NL-based command 132). A machine learning algorithm may then associate the initial input with the corresponding server-compatible command 134 of the library 130 and/or another server-compatible command compatible with the server 106, and store the initial input as a new NL-based command 132 in association with the corresponding server-compatible command in the library 130. As such, while not depicted, the computing device 102 may have access to a list of server-compatible commands compatible with the server 106 (e.g. that may be larger than, and/or different from, the server-compatible command 134 in the library 130) to verify a server-compatible command of the other input; alternatively, the computing device 102 may communicate with the server 106 to verify a server-compatible command of the other input. Alternatively, the library 130 may store a list of server-compatible command that do not correspond with NL-based commands 132 (e.g. until the other input is stored as such).

As depicted, the computing device 102 further comprises an autocomplete engine 136 configured to provide an autocomplete list of the NL-based commands 132 based on partial text received at the command line 112, the autocomplete list filtered by the metadata 120. As such, the autocomplete engine 136 is generally configured to access the metadata 120 (e.g. as represented by a dashed-line, double-ended arrow, between the autocomplete engine 136 and the metadata 120); similarly, the autocomplete engine 136 is generally configured to access the library 130 (e.g. as represented by a dashed-line, double-ended arrow, between the autocomplete engine 136 and the library 130). For example, such partial text may comprise a first letter and/or first letters of a portion of the NL-based commands 132 stored in the library 130, which may be used to populate the autocomplete list. However, NL-based commands 132 with a first letter and/or first letters that do not correspond to the partial text are excluded from the autocomplete list. An example of such an autocomplete list is described below with respect to FIG. 4.

Furthermore, NL-based commands 132 with a first letter and/or first letters that correspond to the partial text but that do not correspond to an available NL-based command 122 for the page 116 are also excluded from the autocomplete list.

As such, the autocomplete list includes the NL-based commands 132 from the library 130 that both have the partial text as a first letter and/or first letters and also correspond to an available NL-based command 122.

In some examples, as depicted, the computing device 102 and, in particular the autocomplete engine 136, may also have access to permissions 138 associated with one or more of: the computing device 102; a given user associated with the computing device 102; and a given entity associated with the computing device 102. As depicted, the permissions 138 are located at the server 106, and may be accessed the computing device 102 and, in particular the autocomplete engine 136, via webservice queries and responses between the computing device 102 and the server 106 (e.g. as represented by a dashed-line, double-ended arrow, between the autocomplete engine 136 and the permissions 138);

however, in other examples, the permissions 138 may be stored at the computing device 102.

For example, the permissions 138 may define what the computing device 102, and/or a given user and/or a given entity is permitted (or not permitted) to do with regards to the server 106. Hence, for example, the permissions 138 may comprise a white list of NL-based commands and/or server-compatible commands that may be used at the computing device 102, and the like, and such a white list may be specific to the computing device 102 and/or a given user and/or a given entity (e.g. such a white list may be associated with an identifier of the computing device 102 and/or a given entity, and/or log-in credentials of a given user). Alternatively, the permissions 138 may comprise a black list of NL-based commands and/or server-compatible commands that may not be used at the computing device 102. However, the permissions 138 may be in any suitable format. Regardless, the autocomplete list may be further filtered using the permissions 138 such that NL-based commands 132 of the autocomplete list are further in a white list of the permissions 138 and/or excluded from a black list of the permissions 138.

Once the autocomplete list is provided at the display screen 104, and an NL-based command 132 may be selected from the autocomplete list (e.g. via the input device 110) and used to populate the command line 112. The NL-based command 132 may be transmitted from the computing device 102 to the server 106, for example to perform a search for a flight from the data 114 stored at the database 108.

However, the NL-based command 132 may further be required to be in a given format such that, when provided to the server 106, a particular action may occur (e.g. after conversion to a server-compatible command). For example, a "SHOP FLIGHT" NL-based command may further require a date, an identifier of an originating airport, and an identifier of a destination airport provided in a particular order and/or format. Such a particular format for an NL-based command 132 may be referred to as "grammar" of an NL-based command 132 (e.g. similar to a grammar of a server-compatible command). As such, the computing device 102 may further comprise a grammar checking engine 140 that stores rules for respective grammar of the NL-based commands 132. When the grammar for an NL-based command 132 at the command line 112 is improper and/or not complete, as determined via the grammar checking engine 140, the computing device 102, may provide an indication of such at the display screen 104 (e.g. such as a prompt to input "required" information in a particular format). Alternatively, rules of the grammar checking engine 140 may map "required" information for NL-based commands 132 to one or more of the fields 124, 126, 128 and, when one or more of the fields 124, 126, 128 include such required information, the computing device 102 may combine an NL-based command 132, provided at the command line 112, with information from associated fields 124, 126, 128. Put another way, an NL-based command 132 provided at the command line 112 may be further combined, at the command line 112, with input received at the page 116 (e.g. via the fields 124, 126, 128) prior to the NL-based command 132 being provided to the server 106.

Hence, for example, an NL-based command 132 of "SHOP FLIGHT" may be combined with input defining an originating airport (e.g. "HOU"), a destination airport (e.g. "LAX") and the date (e.g. "JULY 11" converted to "JUL 11") in the fields 126 (e.g. "SHOP FLIGHT HOU LAX JUL11"). Furthermore, when the information received at a field 126 (e.g. and/or a field 124 and/or a field 128) is not a in a format compatible with the grammar for an NL-based command 132, the computing device 102 may convert the information to the compatible grammar. For example, a date of "JULY 11" may be converted to "JUL11", and the like.

Furthermore, in some examples, a user and/or an entity operating the system 100 and/or the computing device 102 may generate NL-based command 132 and/or generate grammar therefor, and/or generate a mapping between an NL-based command 132 and a corresponding server-compatible command 134 (e.g. at the library 130). In a particular example, a user and/or an entity operating the system 100 and/or the computing device 102 may generate an NL-based command 132 "RECHERCHE VOL" (e.g. French for "SEARCH FLIGHT") and map such an NL-based command 132 to a corresponding server-compatible command 134 such as "AN". Furthermore, the grammar of the NL-based command 132 "RECHERCHE VOL" may be user-generated also, such that for example, a date may precede the airports to be searched, and such grammar may also be checked by the grammar checking engine 140. For example, rather than an NL-based command 132 of "SHOP FLIGHT HOU LAX JUL11", an NL-based command 132 "RECHERCHE VOL 11JUL HOU LAX" may be used and mapped to the server compatible command 134 of "AN" along with corresponding grammar (as described in more detail below).

Heretofore, populating the autocomplete list, and the like, has been described with respect to NL-based commands 132. However, in other examples, the autocomplete list may be completed with server-compatible commands. For example, the computing device 102 may provide, at the display screen 104, a selectable option for completing the autocomplete list with server-compatible commands and/or for switching between completing the autocomplete list with NL-based commands 132 and server-compatible commands. Alternatively, when the partial text does not correspond to a first letter and/or first letters of NL-based commands 132, but the partial text corresponds to a first letter and/or first letters of server-compatible commands (e.g. as stored at the library 130), such server-compatible commands may be used to populate the autocomplete list. Alternatively, the autocomplete list may be completed with both NL-based commands 132 and server-compatible commands.

When the autocomplete list may be completed with server-compatible commands, the metadata 120 may be adapted to define available server-compatible commands (e.g. similar to the available NL-based commands 122) and similarly the library 130 may be adapted to include server-compatible commands that may not be stored in association with an NL-based command 132. In these examples, the autocomplete list may be completed using server-compatible commands which may, or may not, correspond to NL-based commands 132 and which may be filtered using the metadata 120 that defines available server-compatible commands for the page 116.

Similarly, when the autocomplete list may be completed with server-compatible commands, the autocomplete list may be filtered using the permissions 138 which may be adapted to include a white list, and/or black list of server-compatible commands for the computing device 102 and/or a given user and/or a given entity, similar to as described above.

Similarly, the grammar checking engine 140 may be adapted to check grammar of server-compatible commands provided at the command line 112. Hence, for example, a server-compatible command of "AN", to shop for a flight, may be combined with input defining an originating airport, a destination airport and the date in the fields 124 (e.g. "AN11JULHOULAX"), as described above.

As such, the command line 112 may be used to receive both NL-based commands and server-compatible commands. As newer users of the system 100 may be more comfortable with NL-based commands, which may be based on natural language, and as older users of the system 100 may be more comfortable with server-compatible commands, for example due to long experience with the system 100 and/or interacting with the server 106, the command line 112 may be easily used by both newer and older users.

Furthermore, as mentioned above, in some examples the computing device 102 may provide, at the display screen 104, a selectable option for completing the autocomplete list with server-compatible commands and/or for switching between completing the autocomplete list with NL-based commands 132 and server-compatible commands. However, in other examples, such switching may occur automatically depending on the initial input received at the command line 112; for example, initial input corresponding to NL-based commands 132 may result in an autocomplete list with NL-based commands 132, and initial input corresponding to server-compatible commands may result in an autocomplete list with server-compatible commands. Furthermore, an autocomplete list may include both of NL-based commands 132 and server-compatible commands. Hence, for example, a user may initially use a server-compatible command (e.g. using text and/or voice to initially populate the command line 112), change to using NL-based commands 132 (e.g. using text and/or voice), and change back to using server-compatible commands (e.g. using text and/or voice), and the like.

As depicted, the server 106 comprises a mapping engine 142 configured to convert NL-based commands received from the computing device 102 to server-compatible commands with which the server 106 is compatible. For example, the mapping engine 142 may have access to the library 130 (e.g. via communications with the computing device 102, as represented by a dashed-line, double-ended arrow, between the mapping engine 142 and the library 130). Alternatively, the server 106 may maintain a copy of the library 130. Alternatively, the library 130 may be stored at a cloud computing device and/or database, and the like, accessible to both the computing device 102 and the server 106. Regardless, when changes and/or updates occur to the library 130 the mapping engine 142 is understood to have access to such changes and/or updates such that, when an NL-based command is received from the computing device 102, the mapping engine 142 may convert the NL-based command to a server-compatible command. Furthermore, the mapping engine 142 may convert any information that has been combined with an NL-based command received from the computing device 102 (e.g. dates, identifiers of originating and/or destination airports and the like) to a format compatible with a server-compatible command. Hence, for example, the mapping engine 142 may convert an NL-based command of "SHOP FLIGHT HOU LAX JUL11" to a server-compatible command of "AN11JULHOULAX", and use the server-compatible command to search the database 108 and/or the data 114 accordingly. Furthermore, the terms "HOU LAX JUL11" and/or "11JULHOULAX" are understood to comprise search criteria for searching the database 108 and/or the data 114.

The server 106 may then return results determined in response to receiving the NL-based command from the computing device 102, to the computing device 102, for example in a format compatible with server-compatible commands, such as text results, and the like. The computing device 102 comprises a graphic conversion engine 144 configured to convert the results into a graphical format, which may be provided at the display screen 104. Such results, converted to the graphical format, may include graphical selectable options which, when selected, cause corresponding commands to be provided to the server 106. For example, when the results from the server 106 are for a search for a flight, the results may comprise textual results which identifies flights that meet search criteria of the NL-based command received from the computing device 102.

The graphic conversion engine 144 may convert a textual result (e.g. each textual result) into a corresponding graphical icon representing the textual result. For example, when the results comprise textual results which identifies flights, a given set of textual results that identifies a given flight that meets the search criteria, may be converted to a graphical icon and/or graphical selectable option representing the given flight. Such a graphical icon and/or graphical selectable option may be associated with an NL-base command and/or a server-compatible command such that, when the graphical icon and/or graphical selectable option is selected, the associated an NL-base command and/or a server-compatible command may be transmitted to the server 106 to retrieve more information about the given flight and/or book the given flight, and the like. As such, the graphical icons, and the like, may be understood to include graphical selectable options which, when selected, cause corresponding commands to be provided to the server 106. In addition, to comply with accessibility standards on websites and mobile applications, the graphical icons mentioned above, and the like, may be compatible with Screen Readers and similar accessibility aiding software, based on metadata from graphic conversion engine 144.

In some examples, however, graphical results may be provided at the display screen 104 in response to NL-based commands being provided at the command line 112, and textual results may be provided at the display screen 104 in response to server-compatible commands being provided at the command line 112. However, control of a format of the results may be selected via a menu system at the GUI at the display screen 104.

Regardless, the command line 112 may be referred to as a hybrid command line. In particular, the command line 112 may be referred to as a hybrid command line as, when textual commands (e.g. NL-based commands, or optionally, server-compatible commands) are received at the command line 112, graphical results may be provided at the display screen 104. However, the command line 112 may also be referred to as a hybrid command line as, in some examples, both NL-based commands and server-compatible commands may be provided at the command line 112, for example via an autocomplete list and/or via text entry. Indeed, while not previously described, in some examples, the autocomplete list may be provided, but ignored, such that a complete NL-based command, or server-compatible command, is received at the command line 112 via the input device 110, though filtering and/or blocking of unavailable, or unpermitted, commands may still occur. In some examples, the command line 112 may alternatively be referred to as a semantic command line as NL-based commands, which indicate a function and/or semantics and/or meaning of the NL-based commands, may be received at the command line 112.

Figure 2:
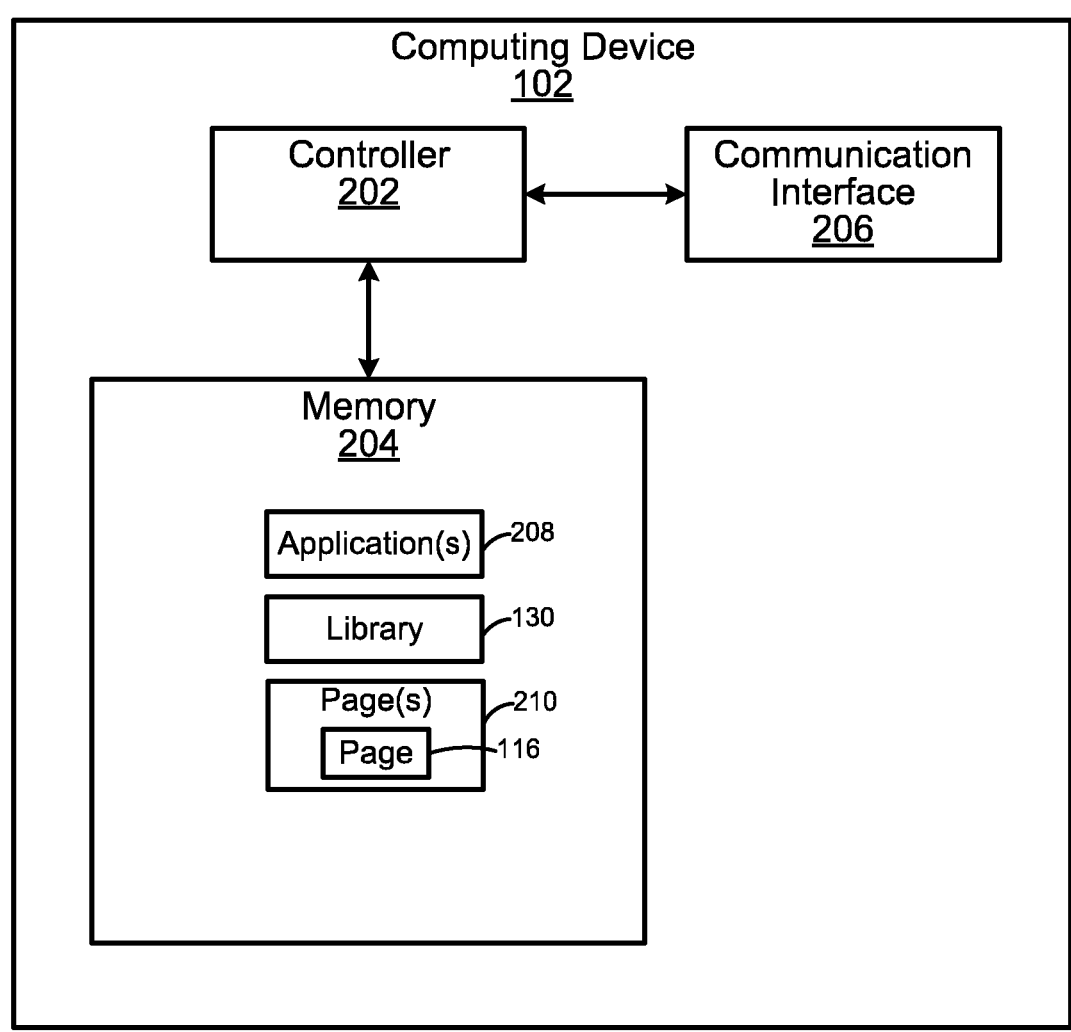
FIG. 2 depicts a device for providing a hybrid command line, according to non-limiting examples.

Attention is next directed to FIG. 2 which depicts a block diagram of an example of the computing device 102. While the computing device 102 is depicted as a stand-alone device herein, the computing device 102 may be implemented as one or more servers and/or one or more cloud computing devices, with functionality thereof distributed across one or more servers and/or one or more cloud computing devices.

As depicted, the computing device 102 comprises a controller 202 communicatively coupled to a memory 204 and a communication interface 206. The controller 202 is understood to be communicatively coupled to the display screen 104. The controller 202 comprise one or more general-purpose processors and/or one or more special purpose logic devices, such as microprocessors (e.g., a central processing unit (CPU), a graphics processing unit, etc.), a digital signal processor, a microcontroller, an ASIC, an FPGA, a PAL (programmable array logic), a PLA (programmable logic array), a PLD (programmable logic device), etc.

The controller 202 is interconnected with the memory 204 which may comprise any suitable memory that stores instructions, for example, as depicted, in the form of one or more applications 208, that, when implemented by the controller 202, cause the controller 202 to implement the functionality of the computing device 102 including, but not limited to, functionality of the engines 136, 140, 144.

The memory 204 may be implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, DVD, magnetic computer storage, and the like). The controller 202 and the memory 204 may be generally comprised of one or more integrated circuits (ICs), and the like.

As depicted, the memory 204 further stores the library 130, however, in other examples, the library 130 may be stored at another device, such as a cloud computing device, accessible to the computing device 102 and/or the controller 202 (e.g. and/or the server 106). Similarly, while not depicted, the memory 204 may further store the permissions 138, however, the permissions 138 may be stored at another device, such as a cloud computing device, accessible to the computing device 102 and/or the controller 202, such as the server 106, as depicted in FIG. 1.

As depicted, the memory 204 further stores one or more pages 210 which, as depicted, may include, but is not limited to, the page 116. The one or more pages 210 may be prepopulated at the memory 204, and updated and/or changed by an administrator of the system 100 and/or the computing device 102, in any suitable manner. However, similar to the library 130 and/or the permissions 138, the one or more pages 210 may be stored at another device, such as a cloud computing device and/or the server 106, accessible to the computing device 102 and/or the controller 202.

In some examples, the one or more applications 208 may include one or more machine learning algorithms, and the like, used to populate the NL-based commands 132 at the library 130 as described herein.

The controller 202 is also interconnected with the communication interface 206, which generally enables the computing device 102 to communicate with the other components of the system 100 via one or more communication links. The communication interface 206 therefore includes any necessary components (e.g. network interface controllers (NICs), radio units, and the like) to communicate with the other components of the system 100 via one or more communication links (e.g. via one or more communication networks). The specific components of the communication interface 206 may be selected based on upon types of the communication links. The computing device 102 may also include input and output devices connected to the controller 202, such as keyboards, pointing devices, display screens, and the like, including, but not limited to, the display screen 104 and/or the input device 110.

While details of the server 106 are not depicted, it is understood that the server 106 may have a similar structure as the computing device 102 but adapted for the functionality of the server 106 as described herein.

Attention is now directed to FIG. 3 which depicts a flowchart representative of a method 300 for providing a hybrid command line. The operations of the method 300 of FIG. 3 correspond to machine readable instructions that are executed by the computing device 102 (e.g. and/or by one or more cloud computing devices), and specifically the controller 202 of the computing device 102 (and/or by controllers of one or more cloud computing devices). In the illustrated example, the instructions represented by the blocks of FIG. 3 may be stored at the memory 204 for example, at least in part as the one or more applications 208. The method 300 of FIG. 3 is one way in which computing device 102, and/or the controller 202 and/or the system 100 may be configured. However, while the method 300 is specifically described with regards to being implemented by the controller 202 and/or the computing device 102 a, it is understood that the method 300 may be implemented by one or more cloud computing devices and/or one or more controllers thereof.

Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 202 and/or the computing device 102 provides, at the display screen 104, the command line 112 in association with the page 116 defined by the DOM 118 that includes the metadata 120 defining the NL-based commands 122 for one or more of the computing device 102 and the page 116. An example, of the command line 112 is shown in FIG. 1 (e.g. at a top portion of a GUI), however, the command line 112 may be provided in any suitable manner. Regardless, the command line 112 may understood as a portion of GUI, and the like, where input may be entered via an input device 110, such as the input device 110.

At a block 304, the controller 202 and/or the computing device 102 receives, at the command line 112, partial text received according to an NL-based format. For example, at the command line 112, a portion of an NL-based command 132 may be received (e.g. a first letter and/or a first few letters, and the like).

At a block 306, the controller 202 and/or the computing device 102 provides, at the display screen 104, using the partial text, an autocomplete list of the NL-based commands 132, the NL-based commands 132 mapped to corresponding server-compatible commands 134, the autocomplete list filtered by the metadata 120.

As has already been described, the autocomplete list may be populated, by the autocomplete engine 136, from the library 130 of available commands that maps the NL-based commands 132 to the corresponding server-compatible commands 134.

For example, as described above, NL-based commands 132 of the library 130 that include the partial text at a beginning thereof are provided in the autocomplete list. Hence, for example, when the partial text comprises "S", NL-based commands 132 starting with "S" are provided in the autocomplete list, though such NL-based commands 132 starting with "S" are filtered by the metadata 120 such that such NL-based commands 132 starting with "S" are also among the available NL-based commands 122 for the page 116. When the partial text is update to "SH", for example, the NL-based commands 132 starting with "SH" are provided in the autocomplete list (e.g. with other NL-based commands 132 removed from the autocomplete list), though such NL-based commands 132 starting with "SH" are again filtered by the metadata 120 such that such NL-based commands 132 starting with "SH" are also among the available NL-based commands 122 for the page 116.

Furthermore, as has already been described, the autocomplete list may be further filtered, by the autocomplete engine 136, by the permissions 138 associated with one or more of: the computing device 102; a given user associated with the computing device 102; and a given entity associated with the computing device 102.

While the system 100 and the method 300 may be implemented using the library 130, any suitable mapping a mapping of the NL-based commands 132 to the corresponding server-compatible commands 134 is within the scope of the present specification. Regardless, it is understood that such a mapping of the NL-based commands 132 to the corresponding server-compatible commands 134 may be specific to one or more of: the computing device 102 a given entity associated with the computing device 102; and a given region associated with the computing device 102. Hence, the NL-based commands 132 of the mapping and/or the library 130 are understood to include NL-based commands that may be used by the computing device 102, in some contexts, but may not be used by the computing device 102 in other contexts (e.g. such contexts defined by the metadata of a page, such as the metadata 120 of the page 116, and, optionally, the permissions 138).

Furthermore, in some examples, the corresponding server-compatible commands 134 may comprise one or more of NDC commands and webservice messages, but the corresponding server-compatible commands 134 may comprise commands in any format compatible with the server 106 (e.g. such as GDS commands, and the like).

At a block 308, the controller 202 and/or the computing device 102 receives a selection of an NL-based command 132 from the autocomplete list which is provided at the command line 112. For example, the input device 110 may be operated (e.g. via a pointing device, such as a mouse, and the like) to select an NL-based command 132 from the autocomplete list (e.g. by clicking on an NL-based command 132 from the autocomplete list).

At a block 310, the controller 202 and/or the computing device 102 provides the NL-based command 132 (e.g. selected at the block 308) to the server 106, which converts the NL-based command 132 to a corresponding server-compatible command 134, for example using the mapping engine 142.

However, as has already been mentioned, the NL-based command 132 (e.g. selected at the block 308) may be further combined (e.g. by the grammar checking engine 140), at the command line 112, with input received at the page 116 (e.g.

from one or more of the fields 124, 126, 128) prior to the NL-based command 132 being provided to the server 106, for example to provide search criteria for searching the database 108 and/or the data 114 with the NL-based command 132.

Furthermore, it is understood that the method 300 may further comprise the controller 202 and/or the computing device 102, coordinating, between the computing device 102 and the server 106, a mapping of the NL-based commands 132 to the corresponding server-compatible commands 134, such that the server 106 is enabled to convert the NL-based command 132 (e.g. provided to the server 106 at the block 310) to the corresponding server-compatible command 134. For example, as depicted, access to the library 130 may be provided to the mapping engine 142.

At a block 312, the controller 202 and/or the computing device 102 receives results from the server 106, the results provided at the display screen 104 in a graphical format which include graphical selectable options which, when selected, cause corresponding commands to be provided to the server 106 in one or more of a server-compatible format and the NL-based format.

For example, the graphical selectable options may be associated with metadata that defines a command, in any suitable format, to be provided to the server 106, and the graphic conversion engine 144 may be further configured to generate such metadata, and/or such metadata may be received with the results.

Other features are within the scope of the present specification and/or the method 300.

For example, the method 300 may further comprise the controller 202 and/or the computing device 102: receiving, at the command line 112, a server-compatible command; providing, to the server 106, the server-compatible command; receiving, from the server 106, corresponding results; and providing, at the display screen 104, the corresponding results in one or more of a textual format and a corresponding graphical format. In these examples, a server-compatible command may be received via an autocomplete list of server-compatible commands (e.g. based on partial text received at the command line 112) and/or in any other suitable manner. Furthermore, filtering of server-compatible commands may occur as described above with respect to the NL-based commands 132. Furthermore, the mapping engine 142 may be bypassed when the server-compatible command is received at the server 106 as the server-compatible command is already in a format compatible with the server 106.

In other examples, the method 300 may further comprise the controller 202 and/or the computing device 102: generating a further NL-based command 132 mapped to a server-compatible command 134 based on input received at the command line 112; and storing the further NL-based command 132 mapped to the server-compatible command 134, for example in the library 130 of available commands for use in populating one or more of the autocomplete list and other autocomplete lists (e.g. for the page 116 and/or other pages 210). In particular, as has already been mentioned, a machine learning algorithm (e.g. of the one or more applications 208) may be trained to populate the library 130, and the like, based on input received at the command line 112.

Figure 4:
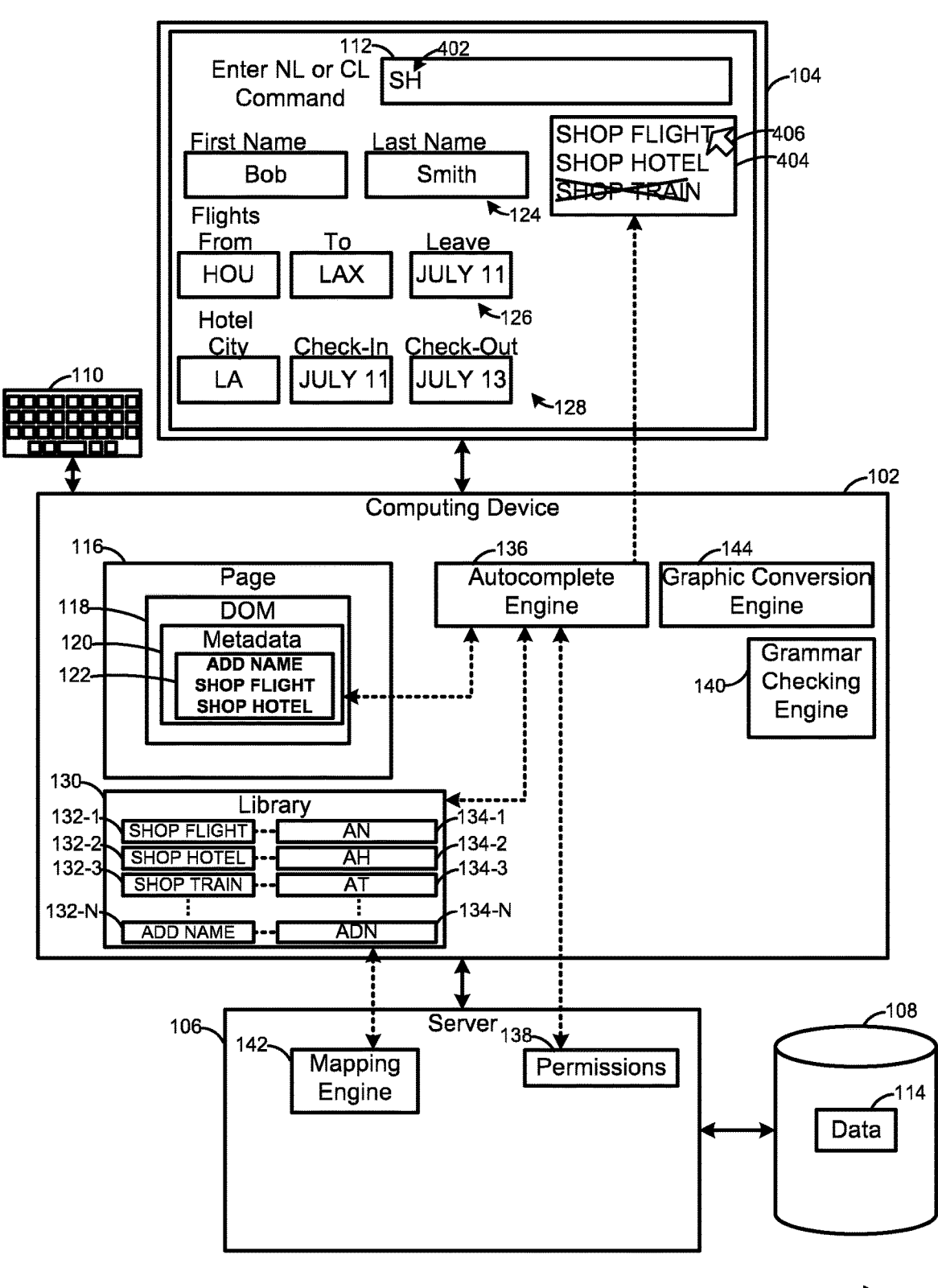
FIG. 4 depicts the system of FIG. 1 implementing a method for providing a hybrid command line, according to non-limiting examples.
Figure 5:
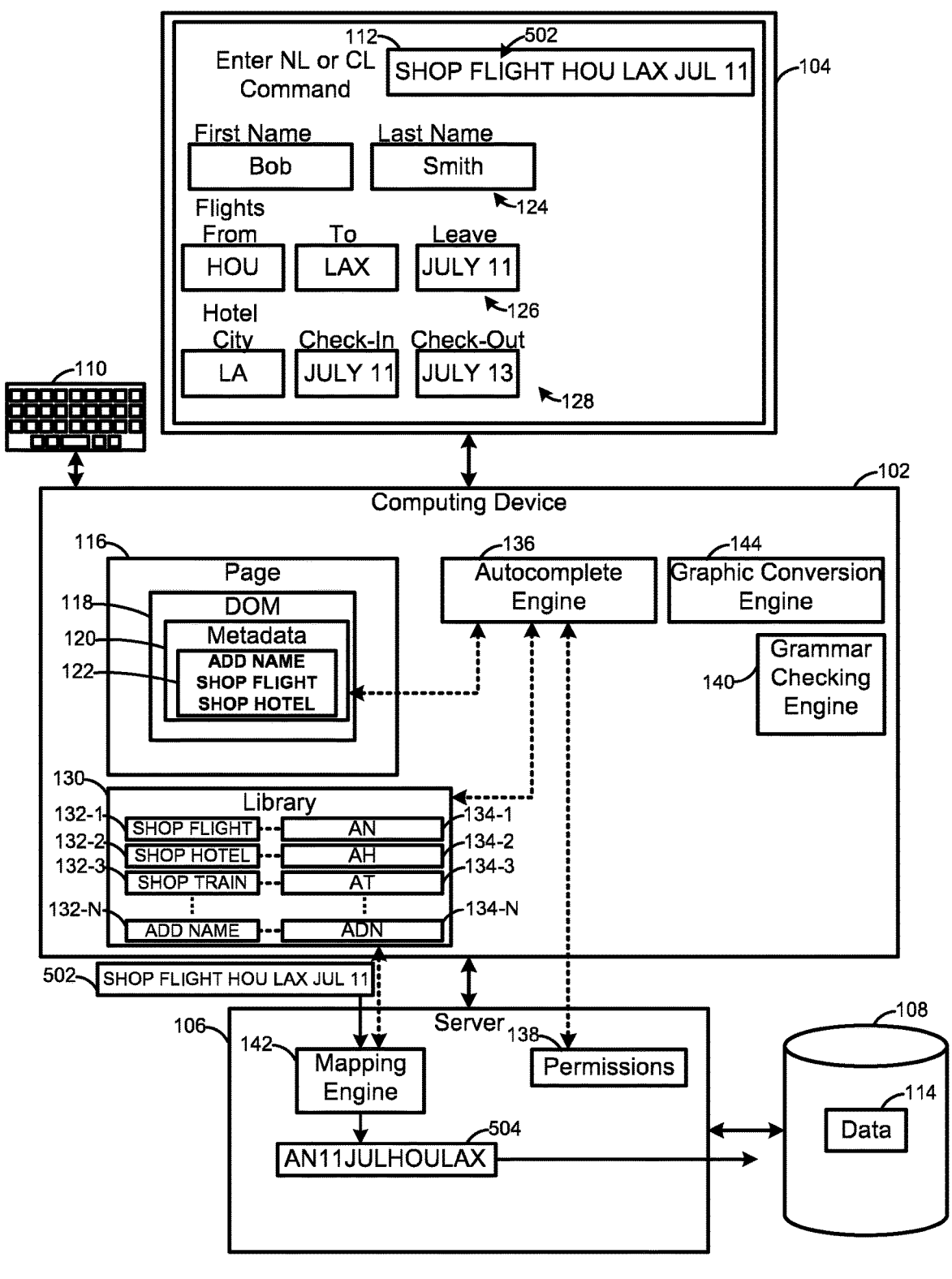
FIG. 5 depicts the system of FIG. 1 continuing to implement the method for providing a hybrid command line, according to non-limiting examples.
Figure 6:
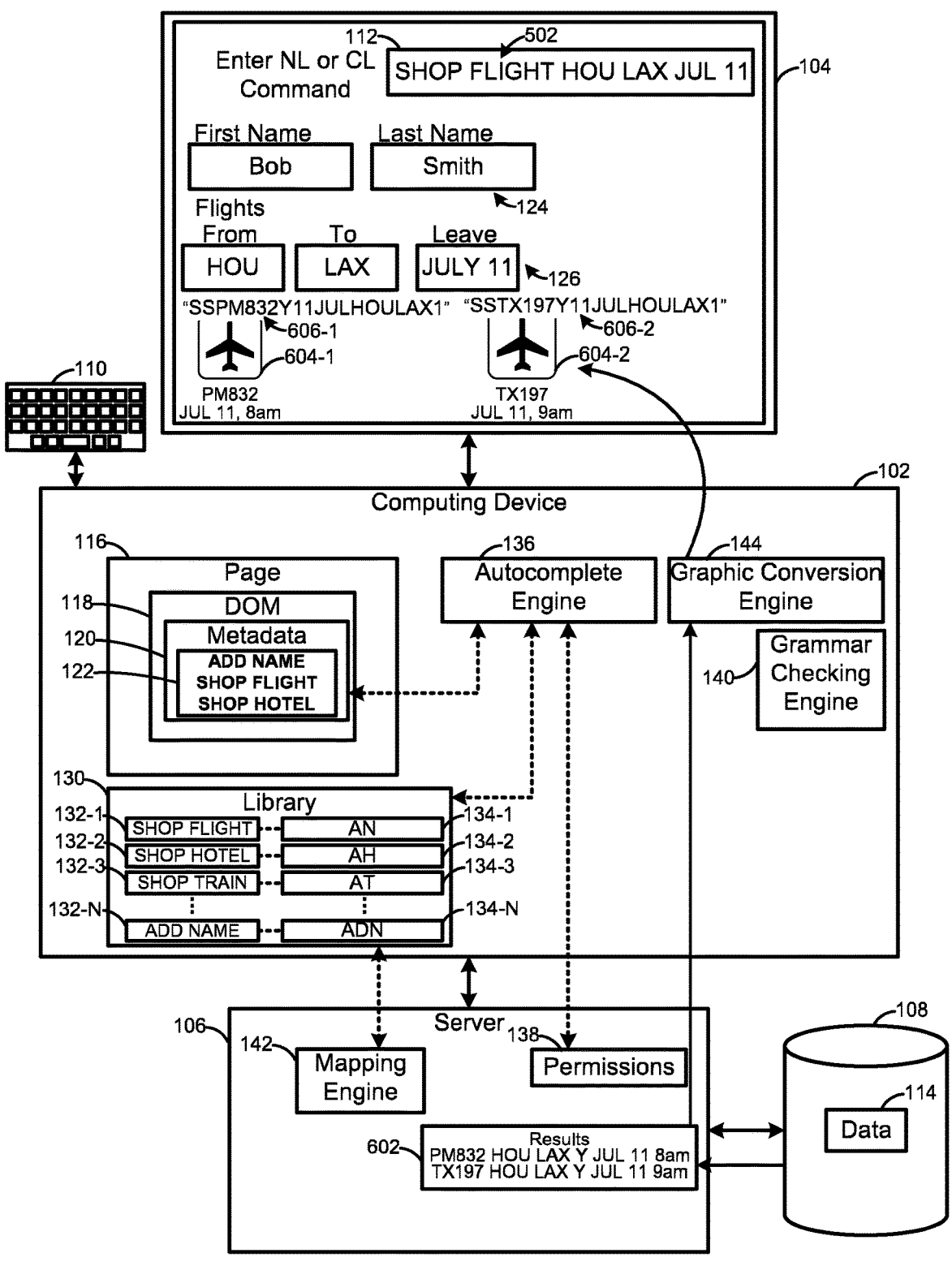
FIG. 6 depicts the system of FIG. 1 continuing to implement the method for providing a hybrid command line, according to non-limiting examples.

Attention is next directed to FIG. 4, FIG. 5 and FIG. 6 which show an example of the method 300. FIG. 4, FIG. 5 and FIG. 6 are similar to FIG. 1 with like components having like numbers.

Attention is first directed to FIG. 4 which depicts example details of the metadata 120 of the DOM 118 and, in particular, shows details of the available NL-based commands 122 for the page 116. For example, as depicted, the available NL-based commands 122 include "ADD NAME", "SHOP FLIGHT", and "SHOP HOTEL". While the available NL-based commands 122 of the metadata 120 are depicted in a list, the metadata 120 may be programmatically provided in computer-code based format at a portion of the DOM 118 that define respective fields 124, 126, 128. For example, metadata 120 defining the available NL-based command 122 "ADD NAME" may be provided at a portion of the DOM 118 that defines the fields 124, metadata 120 defining the available NL-based command 122 "SHOP FLIGHT" may be provided at a portion of the DOM 118 that defines the fields 126, and metadata 120 defining the available NL-based command 122 "SHOP HOTEL" may be provided at a portion of the DOM 118 that defines the fields 128.

Also depicted in FIG. 4 are example details of the library 130. In particular, as depicted, the library 130 has been populated with NL-based commands 132-1, 132-2, 132-3, 132-N of "SHOP FLIGHT", "SHOP HOTEL", "SHOP TRAIN" and "ADD NAME", and respective corresponding server-compatible commands 134-1, 134-2, 134-3, 134-N of "AN", "AH", "AT" and "ADN".

As also depicted in FIG. 4, the command line 112 has been provided (e.g. at the block 302 of the method 300) at the display screen 104, and partial text 402 of "SH" has been received 104 (e.g. at the block 304 of the method 300) at the command line 112 (e.g. via operation of the input device 110). Furthermore, the autocomplete engine 136 has generated and provided (e.g. at the block 306 of the method 300) an autocomplete list 404 of NL-based commands 132 that are in the library and begin with "SH". Hence the autocomplete list 404 may initially include the NL-based commands 132 of "SHOP FLIGHT", "SHOP HOTEL", "SHOP TRAIN". However, as the NL-based command 132 of "SHOP TRAIN" is not in the available NL-based commands 122 of the metadata 120, the NL-based command 132 of "SHOP TRAIN" is removed (e.g. filtered at the block 306 of the method 300) from the autocomplete list 404. Such removal is represented by an "X" through the NL-based command 132 of "SHOP TRAIN" at the autocomplete list 404 however, in general, filtered NL-based command 132 may not be shown in the autocomplete list 404 (e.g. the removal of "SHOP TRAIN" via the "X" is depicted to show the filtering and is not be considered particularly limiting).

It is further understood that the autocomplete list 404 omits the NL-based command 132 "ADD NAME" as the partial text 402 of "SH" does not comprise the first few letters of omits the NL-based command 132 "ADD NAME".

In other examples, the autocomplete list 404 may be filtered using the permissions 138. For example, if the available NL-based commands 122 of the metadata 120 included an NL-based command of "SHOP INSURANCE", which was also included an NL-based command 132 in the library 130, but the permissions 138 indicated that a given user of the computing device 102 (e.g. as determined via log-in credentials of the given user) was not authorized to add insurance to a flight (e.g. via a white list that excluded the NL-based command of "SHOP INSURANCE" and/or a black list that included the NL-based command of "SHOP INSURANCE", such lists associated with the log-in credentials of the given user), the autocomplete list 404 would omit "SHOP INSURANCE" (e.g. regardless that the first few letters of "SHOP INSURANCE" included the partial text 402 "SH").

As also depicted in FIG. 4, the NL-based commands 132 of "SHOP FLIGHT" may be selected (e.g. at the block 308 of the method 300) from the autocomplete list 404 via a pointer 406 operated via the input device 110 and/or in any other suitable manner.

Attention is next directed to FIG. 5 which depicts an NL-based command 502 of "SHOP FLIGHT HOU LAX JUL 11" at the command line 112, generated from the NL-based command 132 of "SHOP FLIGHT" selected from the autocomplete list 404 and combined with input received at the fields 126, as described previously, for example by the grammar checking engine 140.

Indeed, in some examples, an autocomplete list of suggested parameters may also be provided; for example, such an autocomplete list may include the input from the fields 126 and/or such an autocomplete list may include frequently used parameters associated, for example, with the name received at the fields 124, and/or a user of the system 100. A frequently used parameter may include a parameter (such as an airport name and/or an airport code, and the like) that is used more than a threshold number of times (e.g. with the name received at the fields 124 and/or in association with log-in credentials of a user of the system 100 and/or the computing device 102) over a given time period (e.g. an hour, a day, a week, and/or any other suitable time period, which may configurable). Such frequently used parameters may be stored at a database in association the name received at the fields 124, the aforementioned log-in credentials, and the like. Hence, for example, in FIG. 5, once the NL-based command 132 of "SHOP FLIGHT" is provided at the command line 112, a second autocomplete list of suggested airport codes of origination airports may be provided, such as "HOU" from the fields 126, and/or other frequently used airport codes. Once an originating airport code is provided, a third autocomplete list of suggested airport codes of destination airports may be provided, such as "LAX" from the fields 126, and/or other frequently used airport codes. In yet further examples, pairs of originating and destination airport codes, and the like, may be provided (e.g. from the fields 126 and/or frequently used pair of originating and destination airport codes). Indeed, an autocomplete list of dates may also be provided.

The NL-based command 502 is provided (e.g. at the block 310 of the method 300) from the computing device 102 to the server 106, which converts the NL-based command 502 to a corresponding server-compatible command 504 "AN11JULHOULAX". For example, the mapping engine 142 converts "SHOP FLIGHT" of the NL-based command 502 to "AN" (e.g. by accessing the library 130), and converts "HOU LAX JUL 11" of the NL-based command 502 to "11JULHOULAX". Hence, it is further understood that the mapping engine 142 is further configured to convert grammar of NL-based commands to corresponding grammar of server-compatible command.

The server-compatible command 504 is then used to search the database 108 and/or the data 114 to determine results 602, as depicted in FIG. 6, such as flights that meet the search criteria of the NL-based command 502 and/or the corresponding server-compatible command 504. For example, again with attention directed to FIG. 6, the results 602 include textual results that indicate two flights that meet the search criteria of the NL-based command 502 and/or the corresponding server-compatible command 504: a flight having a flight number of "PM832" from Houston Airport "HOU" to Los Angeles Airport "LAX" on July 11 "JUL 11" at "8am"; and a flight having a flight number of "TX197" from Houston Airport "HOU" to Los Angeles Airport "LAX" on July 11 "JUL 11" at "9am". Each of the results 602 also includes an indicator term "Y" which indicates a class of a seat on a flight, though other types of indicators of other types of classes are within the scope of the present specification. While only two flights are shown, the results 602 may comprise any suitable number of flights and/or any other textual data that meet the search criteria of the server-compatible command 504.

The results 602 are received (e.g. at the block 312 of the method 300) at the computing device 102 from the server 106, and provided at the display screen 104 in a graphical format (e.g. as generated by the graphic conversion engine 144) which include graphical selectable options 604-1, 604-2 (e.g. interchangeably referred to hereafter as graphical selectable options 604 and/or a graphical selectable option 604) which, when selected, cause corresponding commands 606-1, 606-2 (e.g. interchangeably referred to hereafter as commands 606 and/or a command 606) to be provided to the server 106 in one or more of the server-compatible format and the NL-based format.

For example, as depicted, the graphical selectable options 604 comprise graphical icons showing airplanes (e.g. to represent a flight for which more detail may be requested from the server 106, and the like), the graphical selectable options 604 further labelled with text showing corresponding flight numbers (e.g. "PM832", "TX197"), a date (e.g. "JUL 11") and a time of the flight (e.g. "8am" and "9am").

The graphical selectable options 604 are also depicted with corresponding commands 606 which may be provided to the server 106 when a corresponding graphical selectable options 604 is selected. However, in other examples, the corresponding commands 606 may not be provided at the display screen 104 but may comprise metadata associated with the graphical selectable options 604. Regardless the corresponding commands 606 may be provided with the results 602 (not depicted) and/or generated in any other suitable manner. As depicted, the corresponding commands 606 comprise a server-compatible command of "SS" combined with corresponding flight numbers (e.g. "PM832" for the command 606-1, and "TX197" for the command 606-2) a date from the field 126, a class indicator (e.g. "Y") and the originating and destination airport codes in a particular format.

It is understood that the server-compatible command of "SS" may request further details regarding a flight from the server 106. Hence, when a graphical selectable option 604 is selected (e.g. via the input device 110 and/or the pointer 406), the corresponding command 606 is provided to the server 106, which may return details of a corresponding flight which may also be provided in a graphical format at the display screen 104 (e.g. in a graphical tabular format), and may include a graphical selectable option for purchasing the flight.

It is further understood that while the fields 128 are not shown in FIG. 6, the fields 128 may be accessible at the display screen 104 "under" the graphical selectable options 604, for example via scrolling and the like, using the input device 110; put another way, the graphical selectable options 604 may be inserted between the fields 126, 128 at the display screen 104.

As should by now be apparent, the operations and functions of the devices described herein are sufficiently complex as to require their implementation on a computer system, and cannot be performed, as a practical matter, in the human mind. In particular, computing devices, and the like, such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, such as a requests and/or the information exchanged between the devices and/or engines described herein, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:

providing, by a computing device, at a display screen, a command line in association with a page defined by a document object model (DOM) that includes metadata defining available natural language (NL) based commands for one or more of the computing device and the page;

receiving, by the computing device, at the command line, partial text received according to an NL-based format;

providing, by the computing device, at the display screen, using the partial text, an autocomplete list of NL-based commands, the NL-based commands mapped to corresponding server-compatible commands;

filtering the autocomplete list using the metadata by one or more of removing and excluding, from the autocomplete list, an NL-based command that is not in the available NL-based commands of the metadata;

receiving, by the computing device, a selection of an NL-based command from the autocomplete list which is provided at the command line;

providing, by the computing device, the NL-based command to a server which converts the NL-based command to a corresponding server-compatible command; and receiving, at the computing device, results from the server, the results provided at the display screen in a graphical format which include graphical selectable options which, when selected, cause corresponding commands to be provided to the server in one or more of a server-compatible format and the NL-based format.

2. The method of claim 1, wherein the autocomplete list is further filtered by permissions associated with one or more of: the computing device; a given user associated with the computing device; and a given entity associated with the computing device.

3. The method of claim 1, wherein the autocomplete list is populated from a library of available commands that maps the NL-based commands to the corresponding server-compatible commands.

4. The method of claim 1, wherein the NL-based command is further combined, at the command line, with input received at the page prior to the NL-based command being provided to the server.

5. The method of claim 1, further comprising:

generating a further NL-based command mapped to a server-compatible command based on input received at the command line; and storing the further NL-based command mapped to the server-compatible command in a library of available commands for use in populating other autocomplete lists.

6. The method of claim 1, further comprising:

receiving, at the command line, a server-compatible command;

providing, to the server, the server-compatible command;

receiving, from the server, corresponding results; and providing, at the display screen, the corresponding results in one or more of a textual format and a corresponding graphical format.

7. The method of claim 1, further comprising:

coordinating, between the computing device and the server, a mapping of the NL-based commands to the corresponding server-compatible commands such that the server is enabled to convert the NL-based command to the corresponding server-compatible command.

8. The method of claim 1, wherein a mapping of the NL-based commands to the corresponding server-compatible commands is specific to one or more of: the computing device; a given entity associated with the computing device; and a given region associated with the computing device.

9. A device comprising:

a communication interface; and a controller configured to:

provide, at a display screen, a command line in association with a page defined by a document object model (DOM) that includes metadata defining available natural language (NL) based commands for one or more of the computing device and the page;

receive, at the command line, partial text received according to an NL-based format;

provide, at the display screen, using the partial text, an autocomplete list of NL-based commands, the NL-based commands mapped to corresponding server-compatible commands;

filter the autocomplete list using the metadata by one or more of removing and excluding, from the autocomplete list, an NL-based command that is not in the available NL-based commands of the metadata;

receive a selection of an NL-based command from the autocomplete list which is provided at the command line;

provide, via the communication interface, the NL-based command to a server which converts the NL-based command to a corresponding server-compatible command; and receive, via the communication interface, results from the server, the results provided at the display screen in a graphical format which include graphical selectable options which, when selected, cause corresponding commands to be provided to the server in one or more of a server-compatible format and the NL-based format.

10. The device of claim 9, wherein the controller is further configured to further filter the autocomplete list by permissions associated with one or more of: the computing device; a given user associated with the computing device; and a given entity associated with the computing device.

11. The device of claim 9, wherein the controller is further configured to populate the autocomplete list from a library of available commands that maps the NL-based commands to the corresponding server-compatible commands.

12. The device of claim 9, wherein the controller is further configured to further combine the NL-based command, at the command line, with input received at the page prior to the NL-based command being provided to the server.

13. The device of claim 9, wherein the controller is further configured to:

generate a further NL-based command mapped to a server-compatible command based on input received at the command line; and store the further NL-based command mapped to the server-compatible command in a library of available commands for use in populating other autocomplete lists.

14. The device of claim 9, wherein the controller is further configured to:

receive, at the command line, a server-compatible command;

provide, to the server, the server-compatible command;

receive, from the server, corresponding results; and provide, at the display screen, the corresponding results in one or more of a textual format and a corresponding graphical format.

15. The device of claim 9, wherein the controller is further configured to:

coordinate, with the server, a mapping of the NL-based commands to the corresponding server-compatible commands such that the server is enabled to convert the NL-based command to the corresponding server-compatible command.

* * * * *